(12) United States Patent
Miller et al.

(10) Patent No.: US 12,525,410 B2
(45) Date of Patent: Jan. 13, 2026

(54) SYSTEMS AND METHODS FOR COORDINATING HANDLE OPERATIONS WHILE OPERATING SOLID-STATE CIRCUIT BREAKERS

(71) Applicant: ROCKWELL AUTOMATION TECHNOLOGIES, INC., Mayfield Heights, OH (US)

(72) Inventors: James P. Miller, Waterford, WI (US); Edward Byaliy, Milwaukee, WI (US); Aiman Kerim, Aarau (CH); Ashwinkumar G. Patel, Aarau (CH); Robert G. Rushmer, Milwaukee, WI (US); Dariusz Poczontek, Warsaw (PL); David Elmiger, Hitzkirch (CH); Grzegorz Ziolkowski, Katowice (PL); Jacek Kijanko, Katowice (PL); Kou Vang, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 546 days.

(21) Appl. No.: 17/948,533

(22) Filed: Sep. 20, 2022

(65) Prior Publication Data
US 2024/0096565 A1    Mar. 21, 2024

(51) Int. Cl.
*H01H 9/06* (2006.01)
(52) U.S. Cl.
CPC ......... *H01H 9/06* (2013.01); *H01H 2009/066* (2013.01)

(58) Field of Classification Search
CPC ............... H01H 9/06; H01H 2009/066; H01H 2071/046; H02B 1/36
(Continued)

(56) References Cited

U.S. PATENT DOCUMENTS

| 8,742,767 B2 | 6/2014 | Messersmith et al. |
| 9,218,928 B2 | 12/2015 | Bellows et al. |

(Continued)

FOREIGN PATENT DOCUMENTS

EP    3879365 A2    9/2021

OTHER PUBLICATIONS

Door locking and monitoring with a 442G access box and an integrated safety controller safety function by Rockwell automation (Apr. 2022) (Year: 2022).*

(Continued)

*Primary Examiner* — Sreeya Sreevatsa
(74) *Attorney, Agent, or Firm* — Fletcher Yoder, P.C.

(57) ABSTRACT

A system includes any number of solid-state circuit breakers that couple between a power supply and an electrical load. The system also includes a housing and the solid-state circuit breakers are disposed within the housing. The housing includes a door sensor that generates a first signal indicative of a position of a door of the housing. The housing also includes an indicator that generates a second signal indicative of a position of a handle of the housing. The system also includes a secondary device communicatively coupled to the solid-state circuit breakers, the door sensor, and the indicator. The secondary device receives the first signal and the second signal and generates an instruction to adjust an operating state of the solid-state circuit breakers based on the first signal and the second signal.

20 Claims, 8 Drawing Sheets

(58) Field of Classification Search
USPC .......................................................... 361/2
See application file for complete search history.

(56) References Cited

U.S. PATENT DOCUMENTS

| | | | |
|---|---|---|---|
| 9,880,223 | B2 | 1/2018 | Messersmith et al. |
| 10,276,321 | B2 | 4/2019 | Kennedy et al. |
| 10,541,530 | B2 | 1/2020 | Kennedy et al. |
| 10,630,069 | B2 | 4/2020 | Kennedy et al. |
| 10,784,061 | B2 | 9/2020 | Kennedy et al. |
| 10,804,692 | B2 | 10/2020 | Kennedy et al. |
| 10,811,867 | B2 | 10/2020 | Kennedy et al. |
| 10,896,790 | B2 | 1/2021 | Kennedy et al. |
| 10,896,791 | B2 | 1/2021 | Kennedy et al. |
| 11,037,749 | B2 | 6/2021 | Kouroussis et al. |
| 11,158,477 | B2 | 10/2021 | Mazur et al. |
| 2006/0108873 | A1* | 5/2006 | Hamasaki ............ H02J 13/0004 307/10.1 |
| 2013/0021163 | A1* | 1/2013 | Watford ................ H02H 3/046 340/638 |
| 2014/0190083 | A1* | 7/2014 | Lepie ..................... E05B 43/00 49/280 |
| 2017/0097755 | A1* | 4/2017 | McAravey ............. G06Q 50/06 |
| 2020/0395739 | A1 | 12/2020 | Santore et al. |
| 2020/0395748 | A1 | 12/2020 | Miller et al. |
| 2021/0066013 | A1 | 3/2021 | Kumar et al. |
| 2021/0126447 | A1 | 4/2021 | Miller |
| 2021/0241989 | A1 | 8/2021 | Kouroussis et al. |
| 2021/0265830 | A1* | 8/2021 | Mazur ..................... H02H 3/10 |

OTHER PUBLICATIONS https://youtu.be/iDOMGAb9cLc?si=AEB2qsflVsntc75F video from 4 minutes to 5 minutes, May 4, 2015 (Year: 2015).* https://youtu.be/iDOMGAb9cLc?si=AEB2qsflVsntc75F video from 4 minutes to 5 minutes (Year: 2015).*

Allen-Bradley; "Door Locking and Monitoring with a 442G Access Box and an Integrated Safety Controller Safety Function," Apr. 22, 2022, https://literature.rockwellautomation.com/idc/groups/literature/documents/at/safety-at129_-en-p.pdf, 24 pages.

Extended European Search Report for Application No. 23198203.4 mailed Feb. 14, 2024, 14 pages.

* cited by examiner

SYSTEMS AND METHODS FOR COORDINATING HANDLE OPERATIONS WHILE OPERATING SOLID-STATE CIRCUIT BREAKERS

BACKGROUND

This disclosure relates generally to systems and methods for circuit breakers used within industrial automation systems. More specifically, the present disclosure discusses a solid-state circuit breaker, which may be used to protect a portion of an industrial automation system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Circuit breakers and other electrical components may be stored in an enclosure that includes an actuator, such as a handle, for operation of the circuit breakers. Many different operating structures and systems have been developed for circuit breakers, particularly when mounted in enclosures. These may include various handles, knobs, and dials, and associated hardware that allow for manipulation of the circuit breaker itself. Solid-state circuit breakers (SSCB) may provide the particular advantage of not using mechanical switching to open or close a circuit, reducing a likelihood of arc flash. However, present operating structures and systems may be incompatible with operation of SSCBs.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system includes any number of solid-state circuit breakers that couple between a power supply and an electrical load. The system also includes a housing and the solid-state circuit breakers are disposed within the housing. The housing includes a door sensor that generates a first signal indicative of a position of a door of the housing. The housing also includes a circuit that generates a second signal indicative of a position of a handle of the housing. The system also includes a secondary device communicatively coupled to the solid-state circuit breakers, the door sensor, and the circuit. The secondary device receives the first signal and the second signal and send an instruction to adjust an operating state of one or more of the solid-state circuit breakers of the plurality of solid-state circuit breakers to the one or more solid-state circuit breakers based on the first signal and the second signal.

In another embodiment, a method includes receiving, at a processor, a plurality of signals from a plurality of solid-state circuit breakers, each signal of the plurality of signals indicative of a corresponding operating state associated with a respective solid-state circuit breaker of the plurality of solid-state circuit breakers. The method also includes, in response to determining at least one signal of the plurality of signals is indicative of an energized state of at least one solid-state circuit breaker of the plurality of solid-state circuit breakers, receiving, at the processor, a second signal indicative of a position of a door of a housing, the plurality of solid-state circuit breakers being disposed within the housing. The method also includes in response to determining the second signal is indicative of the door being in an open position, sending an instruction to adjust an operating state of the at least one solid-state circuit breaker of the plurality of solid-state circuit breakers to the at least one solid-state circuit breaker.

In yet another embodiment, a non-transitory, computer-readable medium includes computer-executable instructions that, when executed, cause at least one processor to perform operations that include receiving a request to adjust a plurality of operational states of a plurality of solid-state circuit breakers disposed within a housing and receiving a first signal indicative of a position of a handle of the housing. The operations also include receiving a second signal indicative of a position of a door of the housing and in response to the first signal being indicative of the handle being in an on position and the second signal being indicative of the door being in a closed position, transmitting one or more instructions to the plurality of solid-state circuit breakers. The one or more instructions cause the plurality of solid-state circuit breakers to adjust the plurality of operational states.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
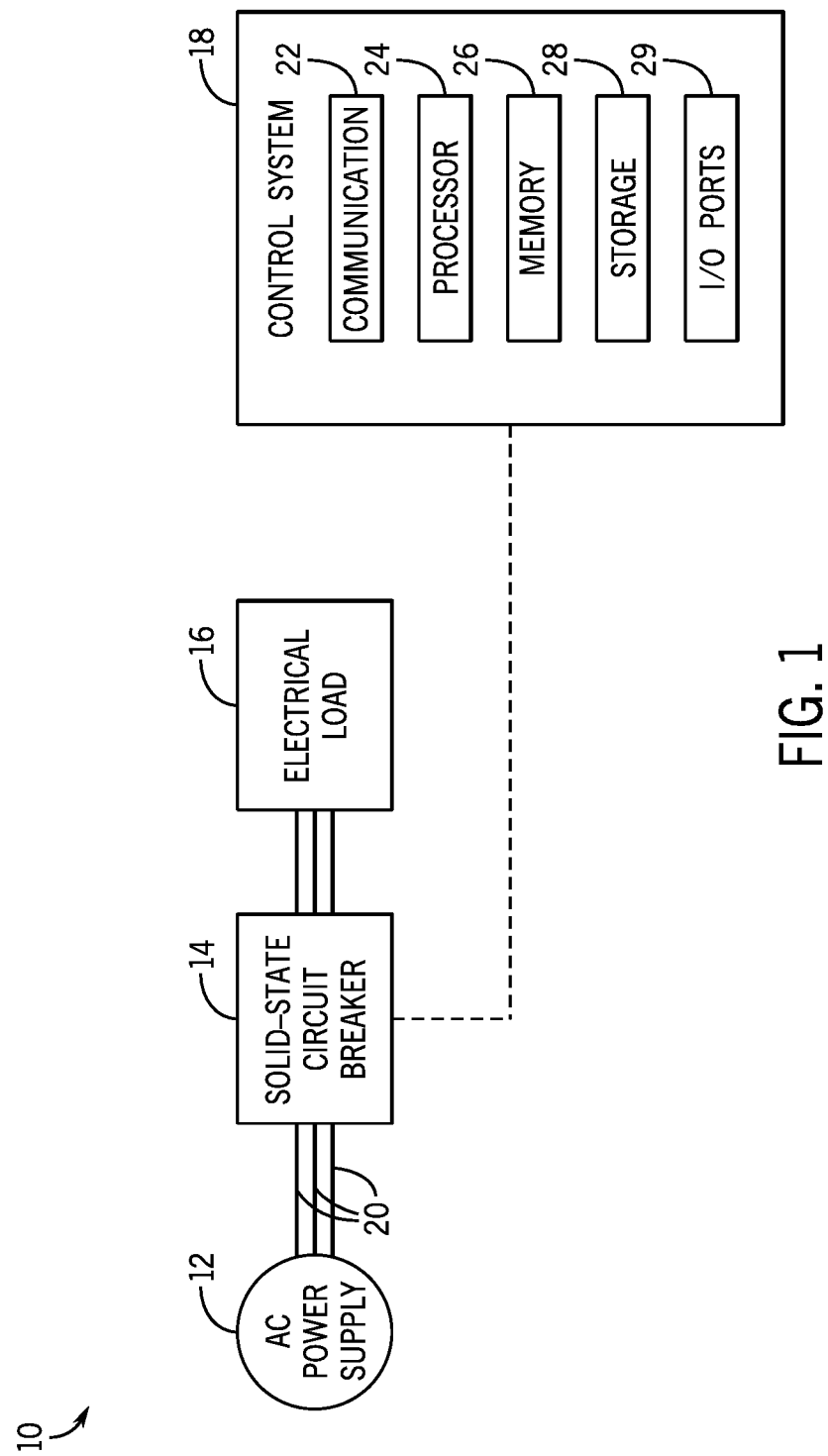
FIG. 1 is a block diagram of a load-feeder system protected by a solid-state circuit breaker, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this present disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is generally directed toward techniques for improving operation of an industrial automation system, and specifically to improving protective circuitry used to protect an electrical load from undesired operating conditions, such as an overvoltage and/or an overcurrent operating condition. Technological advances in integrated circuit technology have enabled solid-state circuitries, such as carbon nanotubes, gallium-nitride-based circuitry (GaN-based circuitry), silicon-carbide-based circuitry (SiC-based circuitry), and/or any other suitable solid-state circuitries, to replace other semiconductor devices within an industrial automation system. Indeed, barriers to using SiC semiconductors, GaN semiconductors, and/or any other suitable solid-state circuitry semiconductors have included commercial price and volatility of materials used to form SiC semiconductors, GaN semiconductors, and/or any other suitable solid-state circuitry semiconductors, conduction losses associated with driving SiC semiconductors, GaN semiconductors, and/or any other suitable solid-state circuitry semiconductors, and heat dissipation challenges associated with driving SiC semiconductors, GaN semiconductors, and/or any other suitable solid-state circuitry semiconductors. Furthermore, some SiC semiconductors, GaN semiconductors, and/or other suitable solid-state circuitry semiconductors have conduction losses and heat dissipation challenges that may make devices formed from SiC semiconductors, GaN semiconductors, and/or other suitable solid-state circuitry semiconductors inefficient. Nevertheless, by employing the SiC semiconductors, GaN semiconductors, and/or any other suitable solid-state circuitry semiconductors to perform the operations described herein, the benefits achieved in various industrial application may outweigh the drawbacks that are attributed to the barriers discussed above.

In general, protective circuitry built from SiC semiconductor devices, GaN semiconductor devices, and/or any other suitable solid-state circuitry semiconductor devices may be capable of operating at higher temperatures and/or higher currents relative to traditional systems that do not use SiC semiconductor devices, GaN semiconductor devices, and/or any other suitable solid-state circuitry semiconductor devices. Semiconductor devices have proved to be challenging to incorporate into circuitries described below due to properties such as, limited thermal conductivity, limited switching frequencies, a relatively low band gap energy, and high-power losses. Thus, protective circuitry, such as circuit breakers, have avoided the use of solid-state circuitry in favor of other protective devices, such as mechanical circuit breakers, fuses, and the like. Devices that use silicon carbide (SiC) semiconductor devices, gallium nitride (GaN) semiconductor devices, and/or any other suitable solid-state circuitry semiconductor devices (e.g., SiC insulated-gate bipolar transistors (IGBT), GaN IGBT, SiC metal-oxide semiconductor field-effect transistor (MOSFET), GaN MOSFET, or other suitable transistor), however, may have relatively improved performance when compared to other types or protective circuitries. For example, protective circuitry that uses a SiC and/or GaN semiconductor device may be capable of withstanding higher voltages (e.g., 10× higher) than other semiconductor devices. This feature may allow the SiC and/or GaN semiconductor to be employed as protection circuitry, as described in more detail below, for industrial applications, which operation in medium to high voltage ranges. Moreover, solid-state circuitry semiconductor devices may operate under higher ambient temperature conditions, as compared to other semiconductor devices, thereby enabling the solid-state circuitry semiconductor devices to maintain its reliability while operating in industrial environments.

In addition, as will be detailed below, the protection circuitry used in various industrial applications rely on multiple components to perform distinct functions. Each of these components are incorporated into the design of enclosures used to house the components. As a result, the housing may become larger as more protection circuit components are used to protect various parts of the industrial system. By performing the embodiments described herein, the functionalities of these separate components may be integrated into the SiC semiconductor devices to reduce the form factor or size of the enclosures previously used to house the protection circuit components. The reduced size attributes for the various types of protection circuitries may enable the industrial automation systems to perform in more confined areas. Moreover, although the costs associated with the solid-state circuitry semiconductor devices may continue to deter use of solid-state circuitry semiconductor devices in certain industrial applications, by employing the embodiments described herein, the solid-state circuitry semiconductor devices may be used to efficiently replace a number of components to allow operations to be controlled in a more effective manner in a limited amount of space.

An example protective device that includes solid-state circuitry semiconductor devices may be a solid-state circuit breaker. Solid-state circuit breakers may provide the particular advantage of not using mechanical switching to open or close a circuit. Reducing or eliminating use of mechanical switching may reduce a likelihood of arc flash and/or reduce a severity of exposed incident energy if an arc flash were to occur. When occurrences of arc flash are reduced, reliability and lifespans of systems using solid-state circuit breakers may improve (e.g., increase). Furthermore, since a likelihood of arc flash may be eliminated and/or reduced when using a solid-state circuit breaker, operators of solid-state circuit breakers may reduce a level of personal protective equipment (PPE) worn while operating the solid-state circuit breakers, such as the level of PPE worn when restarting (e.g., coupling line-side (or supply-side) to load-side, coupling supply-side to load-side) a solid-state circuit breaker after a trip event of the solid-state circuit breaker. This may also apply to levels of PPE worn when working around or nearby to equipment protected by the solid-state circuit breaker (e.g., equipment downstream from the solid-state circuit breaker).

Circuit breakers and other electrical components may be stored in an enclosure that includes an actuator, such as a handle, for operation of the circuit breakers. Many different operating structures and systems have been developed for circuit breakers, particularly when mounted in enclosures. These may include various handles, knobs, and dials, and associated hardware that allow for manipulation of the circuit breaker itself. Solid-state circuit breakers (SSCB)

may provide the particular advantage of not using mechanical switching to open or close a circuit, reducing a likelihood of arc flash. However, present operating structures and systems may be incompatible with operation of SSCBs.

Keeping the foregoing in mind, motor control centers (MCCs) may be designed to use solid-state circuit breakers compatible with three-phase (e.g., multi-phase) electrical distribution systems. The solid-state circuit breakers may be used as an independent electrical feeder (e.g., main line) and/or as a motor starter, in combination with additional solid-state circuit breakers as a motor starter, and/or in similar operation as a non-solid-state circuit breaker. As such, the solid-state circuit breaker may be suitable for protection of electrical couplings between a power source or supply for a motor and the motor (e.g., feeder between a generator and a motor as depicted in FIG. 1), as well as for protection of electrical couplings between an inverter and a motor (e.g., as overload protection circuitry depicted in FIG. 2). When using the solid-state circuit breaker as a motor starter, the solid-state circuit breaker may be operated to perform a reverse starting operation, a non-reverse (e.g., forward) starting operation, a soft-start starting operation (e.g., stepped starting operation), and the like.

By definition, a starter that does not implement SiC semiconductor technologies may include three major components: a galvanic disconnecting device with branch circuit protection (e.g., a circuit breaker, fused disconnect switch), a thermal overload protection device (e.g., electronic overload), and an isolating device in the form of a contactor. These three components work together as a starter assembly for a motor load (e.g., electric motor circuit), such as a full voltage non-reversing starter system. For example, each disconnect switch in a starter may operate at a same time to open or close the electrical circuit to the motor load.

The solid-state circuit breaker may also operate to interrupt its circuit aligned with (e.g., at a suitable frequency, at a suitable response time) various standards of electrical governing bodies. Similarly, the solid-state circuit breaker may also operate in response to detection of a short circuit with a response time and/or response behavior in accordance with the standards of electrical governing bodies.

Some solid-state circuit breakers may include an integrated air-gap disconnect. The integrated air-gap disconnect may permit galvanic isolation between line-side and load-side within the solid-state circuit breaker as opposed to in line with the solid-state circuit breaker. Control circuitry of the solid-state circuit breaker may utilize the integrated air-gap disconnect to perform lockout/tagout control operations. The galvanic isolation protection provided within the solid-state circuit breaker may be further supplemented by including an additional circuit breaker and/or fused disconnect switch upstream of the solid-state circuit breaker, such as to further decouple the solid-state circuit breaker from a portion of a circuit. In some cases, the solid-state circuit breaker may be associated with a latch mechanism that interlocks the solid-state circuit breaker. Interlocking the solid-state circuit breaker may stop an operator from removing the solid-state circuit breaker while the solid-state circuit breaker is closed.

In some cases, a mechanical device may be included within the solid-state circuit breaker to operate a galvanic disconnecting device within the solid-state circuit breaker additional to or alternative of the latch mechanism and/or the fused disconnect switch. Operating the galvanic disconnecting device into an open position (e.g., such that an air gap is present between metal contacts associated with a line-side and a load-side of the solid-state circuit breaker) may provide mechanical galvanic isolation. It is noted that in some cases the galvanic disconnecting device implements or is the integrated air-gap disconnect. The mechanical device may be installed and attached to a physical disconnect handle that extends to the outside of a motor control center unit or drawer. Operating the physical disconnect handle to cause the mechanical device to operate the galvanic disconnecting device may provide a way to physically decouple a supply-side from a load-side of the solid-state circuit breaker. Physically decoupling the supply-side from the load-side of the solid-state circuit breaker may reduce a likelihood of arcs occurring during the removal of the solid-state circuit breaker and/or may be desired in certain maintenance operations and/or for unit withdrawal, such as to comply with the various electrical governing bodies standards and/or when additional isolation of the solid-state circuit breaker from an electrical supply is desired.

Keeping the foregoing in mind, the solid-state circuit breaker may perform operations of overload protection circuitry, disconnect switching circuitry, and motor controlling circuitry using circuitry within a same physical enclosure, such as when performing starting or steady state operations. This may permit the three devices (e.g., overload protection circuitry, disconnect switching circuitry, and motor controlling circuitry) to be replaced by the solid-state circuit breaker within a starter. Additional details with regard to the solid-state circuit breaker described above will be discussed below with reference to FIGS. 1-7.

By way of introduction, FIG. 1 is a block diagram of a feeder system 10 (e.g., motor feeder system, motor control center (MCC) feeder system), which may be part of an industrial automation system. The feeder system 10 may include a power supply, such as an alternating current (AC) power supply 12, to supply power to loads coupled downstream. The feeder system 10 may also include a solid-state circuit breaker 14 coupled to the AC power supply 12. The AC power supply 12 may supply current and/or voltage to an electrical load 16 coupled to the solid-state circuit breaker 14.

When abnormal operation occurs, such as when a voltage that is uncharacteristically high or low is delivered to the electrical load 16, the solid-state circuit breaker 14 may electronically disconnect the AC power supply 12 from the electrical load 16. As such, the solid-state circuit breaker 14 may protect the electrical load from supply voltages and/or supply currents that may damage the solid-state circuit breaker 14.

Any suitable number of supply devices may be represented by the AC power supply 12, such as any combination of rectifiers, converters, power banks, generation devices, or the like. It should be understood that the feeder system 10 may include one or more motor-drive systems, motors, MCCs, or the like as the electrical load, or coupled between any of the depicted devices and that the feeder system 10 may include one or more additional components not depicted in FIG. 1.

For example, the feeder system 10 may include any suitable type of rectifier device that includes a number of switches controllable by any suitable power converter. For example, the AC power supply 12 may include an active front end (AFE) converter, a diode converter, a thyristor converter, a diode front end rectifier, or the like. In some embodiments, the switches of the AC power supply 12 may be semiconductor-controlled devices, transistor-based (e.g., insulated-gate bipolar transistor (IGBT), metal-oxide semiconductor field-effect transistor (MOSFET), or other suitable transistor) devices, or other suitable devices in which the opening and/or closing of the switch may be controlled using an external signal (e.g., gate signal), which may be provided by the control system 18. The AC power supply 12 may provide AC supply signals (e.g., AC voltage, AC current, a regulated AC output) on a bus 20, which may be provided to the solid-state circuit breaker 14.

It is noted that the feeder system 10 may be used in a variety of industrial automation systems, such as food manufacturing, industrial operations systems, refineries, or the like. In this way, implementation and use of the solid-state circuit breaker 14 to protect various electrical loads may improve operations of industrial automation systems. For example, using a solid-state circuit breaker 14 may reduce or eliminate usage of electrical protection devices that rely at least partially on mechanical switching. Reducing or eliminating use of mechanical switching may reduce a likelihood of arc flash and/or reduce a severity of exposed incident energy if an arc flash were to occur. When occurrences of arc flash are reduced, reliability and lifespans of systems using solid-state circuit breakers 14 may improve (e.g., increase) and operators may reduce a level of personal protective equipment (PPE) worn while operating nearby to the solid-state circuit breaker 14.

Industrial automation systems may operate in response to signals generated by the control system 18. The control system 18 may include any suitable number of electronic devices and/or components to generate and/or manage generation of the control signals. For example, the control system 18 may include a communication component 22, a processor 24, a memory 26, storage 28, and input/output (I/O) ports 29, or the like, for generating and managing generation of control signals.

The communication component 22 may be a wireless or wired communication component that facilitates communication between the control system 18, the solid-state circuit breaker 14, or other suitable electronic devices. The processor 24 may be any type of computer processor or microprocessor capable of executing computer-executable code. The memory 26 and the storage 28 may be any suitable articles of manufacture that may serve as media to store processor-executable code, data, or the like. These articles of manufacture may represent computer-readable media (i.e., any suitable form of memory or storage) that may store the processor-executable code used by the processor 24 to perform the presently disclosed techniques, such as to predictively response to operational changes, or the like.

The I/O ports 29 may couple to one or more sensors, one or more input devices, one or more displays, or the like, to facilitate human or machine interaction with the control system 18, the solid-state circuit breaker 14, or other suitable electronic devices. For example, based on a notification provided to the operator via a display, the operator may use an input device to instruct the adjustment of a parameter associated with the solid-state circuit breaker 14.

Keeping the foregoing in mind, sometimes the control system 18 may communicate with the solid-state circuit breaker 14 using one or more communication techniques. For example, the solid-state circuit breaker 14 may include a controller area network (CAN) communicative coupling and/or an internet protocol (IP)-based communicative coupling, such as an Ethernet IP communicative coupling, to the control system 18. These communicative couplings may enable the solid-state circuit breaker 14 to communicate with the control system 18 without intervention from a host computer. Thus, the solid-state circuit breaker 14 may communicate directly with the control system 18 without using an intervening computing device.

In some cases, the control system 18 may use one or more configuration interfaces to communicate with the solid-state circuit breaker 14. The configuration interface may be a graphical user interface and/or logically-defined data object (e.g., data table) that permits the control system 18 and/or user to provide and/or update a configuration and/or to obtain a status of the solid-state circuit breaker. In this way, the configuration interface may be a data boundary used to translate configurations from devices external to the solid-state circuit breaker 14 to a format readable by the solid-state circuit breaker 14 and/or to translate statuses from the solid-state circuit breaker 14 into a format readable by devices external to the solid-state circuit breaker 14.

In some cases, the control system 18 may use the configuration interface-based communication techniques to instruct the solid-state circuit breaker 14 into a particular mode of operation. The mode of operation may define how signals are transmitted through or from the solid-state circuit breaker 14. For example, the solid-state circuit breaker 14 may be instructed into a soft-start operational mode, a forward operational mode, and/or a reverse operational mode, and thus may behave like a motor starter. In some cases, the solid-state circuit breaker 14 may be operated in combination with one or more additional solid-state circuit breakers 14 also operated into the same operational mode. The soft-start operational mode may cause the solid-state circuit breaker 14 to provide incrementally-generated supply power or supply signals to the electrical load 16, such as to provide a start-up level of supply signals at a relatively gradual pacing or timing. The forward operational mode may cause the solid-state circuit breaker 14 to provide supply power in a way to cause the electrical load to operate in a forward direction relative to a reference direction, while the reverse operational mode may cause the solid-state circuit breaker 14 to provide supply power in a way as to cause the electrical load to operate in a reverse direction relative to the reference direction.

The control system 18 may also permit configuration of properties of the solid-state circuit breaker 14 based at least in part on thermal measurements and/or metering information, such as phase-phase voltages, phase-to-ground voltages, input current, output current, frequency, power, status of the solid-state circuit breaker 14 (e.g., Open Close, Blocked, Failure), or the like. In this way, the control system 18 may determine a current operation of the solid-state circuit breaker 14 and use the information of the current operation to determine how to adjust an operation of the solid-state circuit breaker 14. For example, the control system 18 may determine that the solid-state circuit breaker 14 is blocked and has a thermal measurement higher than a historical average for the solid-state circuit breaker 14. Using this information, the control system 18 may determine that an undesired operation is occurring, and thus may determine to open the solid-state circuit breaker 14. Furthermore, the control system 18 may use this information to operation other devices upstream and/or downstream of the solid-state circuit breaker 14, such as controlling additional protection circuitry to further isolate the solid-state circuit breaker 14 from the industrial automation system.

The properties, in some embodiments, may also be used to define operation limits corresponding to determined settings to be used to protect the load. The operation limits may correspond to operating ranges set by governing agencies or standard committees, such as American National Standards Institute (ANSI®), Underwriters Laboratories (UL®), International Electrotechnical Commission (IEC®) or the like, and may be used to protect the solid-state circuit breaker 14, the electrical load 16, or the like from undesired operating conditions. Furthermore, the properties may also define protection groups or classes associated with the solid-state circuit breaker 14. Protection groups or classes may correspond to groups of electrical loads 16 that may have a same protection scheme. These protection groups or classes may be classifications of types of protection for different devices set by governing agencies or standard committees. When the electrical load 16 is classified as part of a protection group with another electrical load 16, it may be desired to protect both electrical loads 16 with a solid-state circuit breaker 14 set to the same settings. In this way, when a different electrical load 16 is installed to the solid-state circuit breaker 14, the protection groups or classes may be updated to indicate the new group or class of the new electrical load 16. This may cause the solid-state circuit breaker 14 to automatically update its operational settings to accommodate the new electrical load 16. Use of properties may thus improve deployment of setting changes to solid-state circuit breakers 14 by making an overall installation process of a new electrical load 16 relatively faster since less time is spent updating operational settings of the solid-state circuit breaker 14. In some embodiments, the solid-state circuit breaker 14 may detect a protection group or class of its electrical load 16 automatically and/or without receiving the property from the control system 18. In these cases, the solid-state circuit breaker 14 may sense metering information (e.g., operational properties) of the electrical load 16 to determine what protection group or class applies to the electrical load 16. For example, the solid-state circuit breaker 14 may determine that it outputs three-phase power and that its load is operating at a relatively high voltage that corresponds to an operating voltage of a large motor load, thus the solid-state circuit breaker 14 may automatically classify its electrical load 16 as a large motor based on this analysis.

In some cases, the control system 18 may use configuration interface techniques to receive thermal measurements and/or metering information directly from the solid-state circuit breaker 14. For example, the solid-state circuit breaker 14 may directly report values sensed by one or more measurement circuitries coupled to one or more portions of the solid-state circuit breaker 14 via updating of data stored in a table, data object, or the like, associated with the configuration interface between the solid-state circuit breaker 14 and the control system 18. As such, the solid-state circuit breaker 14 may report its sensed values including, but not limited to, ambient temperature, internal temperature, phase-to-phase voltage, internal voltage, phase-to-line voltage, current, frequency, power input, power output, or the like. Furthermore, in some cases, the solid-state circuit breaker 14 may report its status, such as whether it is operated in an open state (e.g., Open status), a closed state (e.g., Closed status), whether its closing/opening function is blocked and/or functionally prevented (e.g., Blocked status), and/or whether the solid-state circuit breaker 14 is non-operational and/or uncommunicative (e.g., offline) in the same data object associated with the configuration interface.

Figure 2:
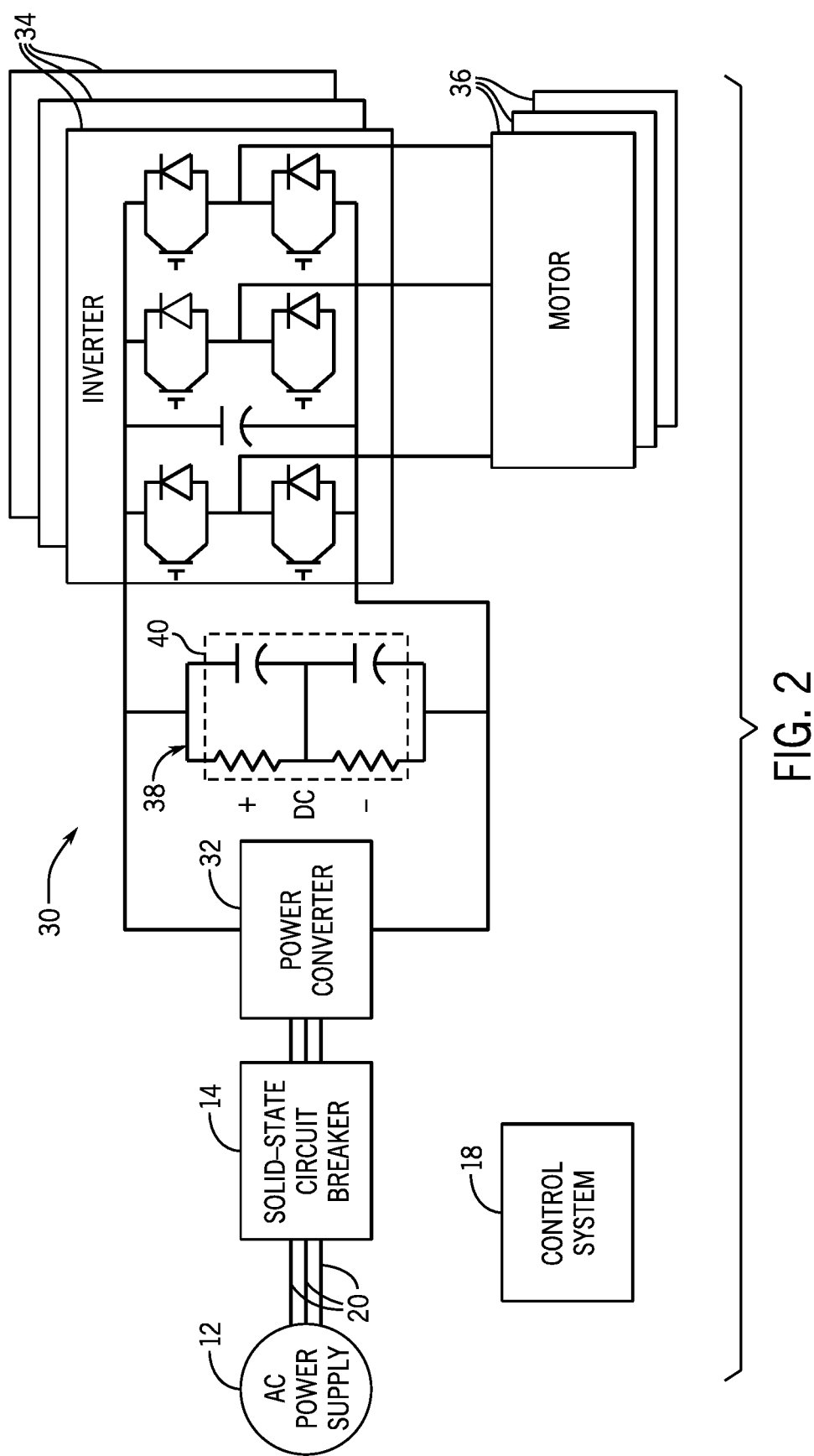
FIG. 2 is a block diagram of a motor-feeder system protected by the solid-state circuit breaker of FIG. 1, in accordance with an embodiment.

Keeping the foregoing in mind, FIG. 2 is a block diagram of a motor-feeder system 30, an example of the feeder system 10. FIG. 2 illustrates how the electrical load 16 may include a power converter 32, an inverter 34, a motor 36, and a direct current (DC) bus 38. The motor-feeder system 30 may be part of an industrial automation system. The motor-feeder system 30 may include the power converter 32 and the control system 18 that may control the operation of the power converter 32. The motor-feeder system 30 may also include one or more inverters 34. The inverters 34 may convert the DC voltage output by the power converter 32 into a controllable AC voltage used to power the motor 36.

In general, the power converter 32 may receive three-phase alternating current (AC) voltage from the AC power supply 12 and convert the AC voltage into a direct current (DC) voltage (e.g., voltage on DC voltage bus 38) suitable for powering a load (e.g., rectify a DC voltage based on the voltage from the AC power supply 12). It is noted that in some examples, the AC power supply 12 is replaced by a DC power supply, and the power converter 32 may operate to filter and/or improve a signal quality of the DC power supply. As such, the power converter 32 supplies a load, such as the one or more inverters 34, a DC voltage on the DC voltage bus 38. In certain embodiments, the one or more inverters 34 then convert the DC voltage to an AC voltage to be supplied to one or more devices connected to the inverters 34, such as motors 36. The one or more inverters 34 may then, in turn, control the speed, torque, or other suitable operation of the one or more devices (e.g., one or more motors 36) by controlling the AC voltage provided to the one or more devices. It should be understood that the industrial automation system may include one or more motor-feeder systems 30, and each of the motor-feeder systems 30 may include one or more additional components not depicted in FIG. 1.

The power converter 32 may include any suitable power converter device that includes a number of switches that may be controlled. For example, the power converter 32 may be an active front end (AFE) converter, a diode converter, a thyristor converter, a diode front end rectifier, or the like. In some embodiments, the switches of the power converter 32 may be semiconductor-controlled devices, transistor-based (e.g., IGBT, MOSFET, or other suitable transistor) devices, or other suitable devices in which the opening and/or closing of the switch may be controlled using an external signal (e.g., gate signal), which may be provided by the control system 18. The power converter 32 may provide the DC voltage (e.g., a regulated DC output voltage) on a direct current (DC) bus 38, which may be provided to the inverters 34 and may regenerate extra or additional power back to the AC power supply 12 (or DC power supply). The power converter 32 may also operate to maintain a unity power factor, generate a stable DC voltage from the AC power supply 12 (or DC power supply), control a power factor transmitted to the one or more inverters 34, and the like to generally control power supplied to the one or more inverters 34.

As discussed above, the power converter 32 may use the switching frequencies of the switches (e.g., power conversion devices) to convert the voltage from the AC power supply 12 into the DC voltage. The DC voltage may be generated across a resistor-capacitor (RC) circuit 40 including one or more resistors and one or more capacitors. In addition, the control system 18 may control the operation of the power converter 32 to compensate for resonance, unknown line impedances, and the like.

The motor-feeder system 30 may be at least partially protected by use of the solid-state circuit breaker 14. When the solid-state circuit breaker 14 detects or receives a notification of an upstream fault and/or a downstream fault event, control circuitry of the solid-state circuit breaker 14 may cause the solid-state circuit breaker 14 to automatically open. In particular, the solid-state circuit breaker 14 may protect the motors 36 by opening in response to sensing one or more sensed parameters and determining that the one or more sensed parameters are greater than one or more threshold values corresponding to a desired operation of the motor-feeder system 30.

Figure 3:
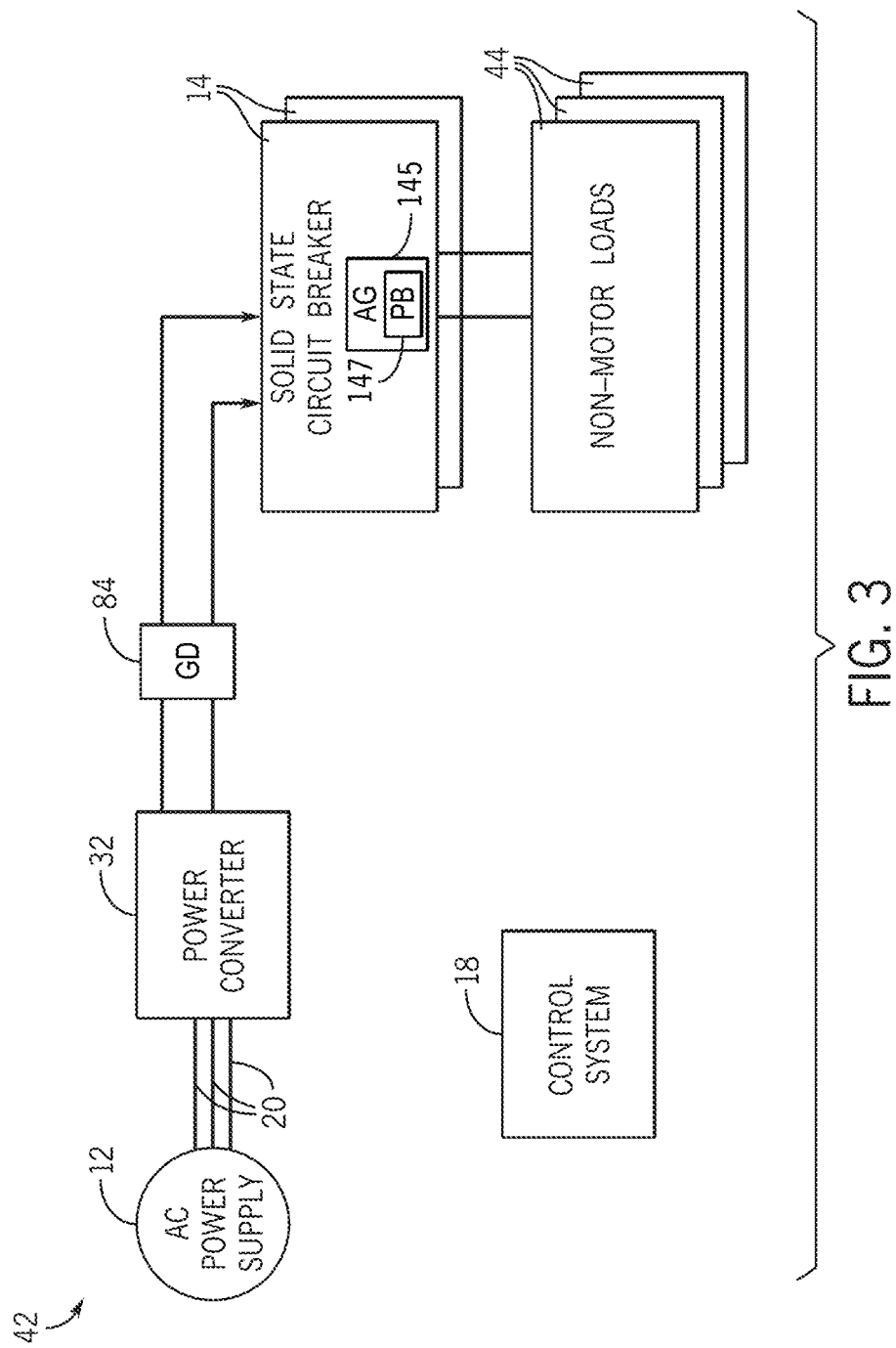
FIG. 3 is a block diagram of non-motor-feeder system protected by direct current (DC) solid-state circuit breaker, in accordance with an embodiment.

The figures described above have illustrated the solid-state circuit breaker 14 placed between the AC power supply 12 (or DC power supply) and the electrical load 16. However, in some cases, the solid-state circuit breaker 14 may be disposed after the power converter 32, as illustrated in FIG. 3. In this case, the solid-state circuit breaker 14 may receive a DC voltage at its line-side and output a DC voltage at its load-side.

FIG. 3 is a block diagram of a non-motor-feeder system 42 protected by the solid-state circuit breaker 14. The solid-state circuit breaker 14 of FIG. 3 may be compatible with direct current (DC) supply voltages and/or DC supply currents (e.g., a generation system that generates DC supply voltages and/or DC supply currents). In the example non-motor-feeder system 42, one or more solid-state circuit breakers 14 may be coupled between a power converter 32 and one or more non-motor loads 44. FIG. 3 depicts one of many suitable uses of the solid-state circuit breaker 14.

Keeping the foregoing in mind, the solid-state circuit breaker 14 may be suitably used to protect a motor 36, a non-motor load 44, or both. Generally, the solid-state circuit breaker 14 may be coupled in line with a feeder bus for the electrical load 16. For example, the solid-state circuit breaker 14 may be coupled between an AC power supply 12 (e.g., a generator) and an electrical load 16 (e.g., motor 36, non-motor load 44).

The solid-state circuit breaker 14 may be capable of providing circuit interruption and/or short circuit protection suitable to various standards of electrical governing bodies based at least in part on control operations of the control system 18 operating the solid-state circuit breaker 14 in accordance with the standards. Furthermore, in some embodiments, the solid-state circuit breaker 14 may include an integrated air-gap disconnect and/or integrated galvanic disconnecting device to further isolate the solid-state circuit breaker 14 in the event of a fault occurring (e.g., isolate in addition to any air-gap function of the solid-state circuit breaker 14).

Figure 4:
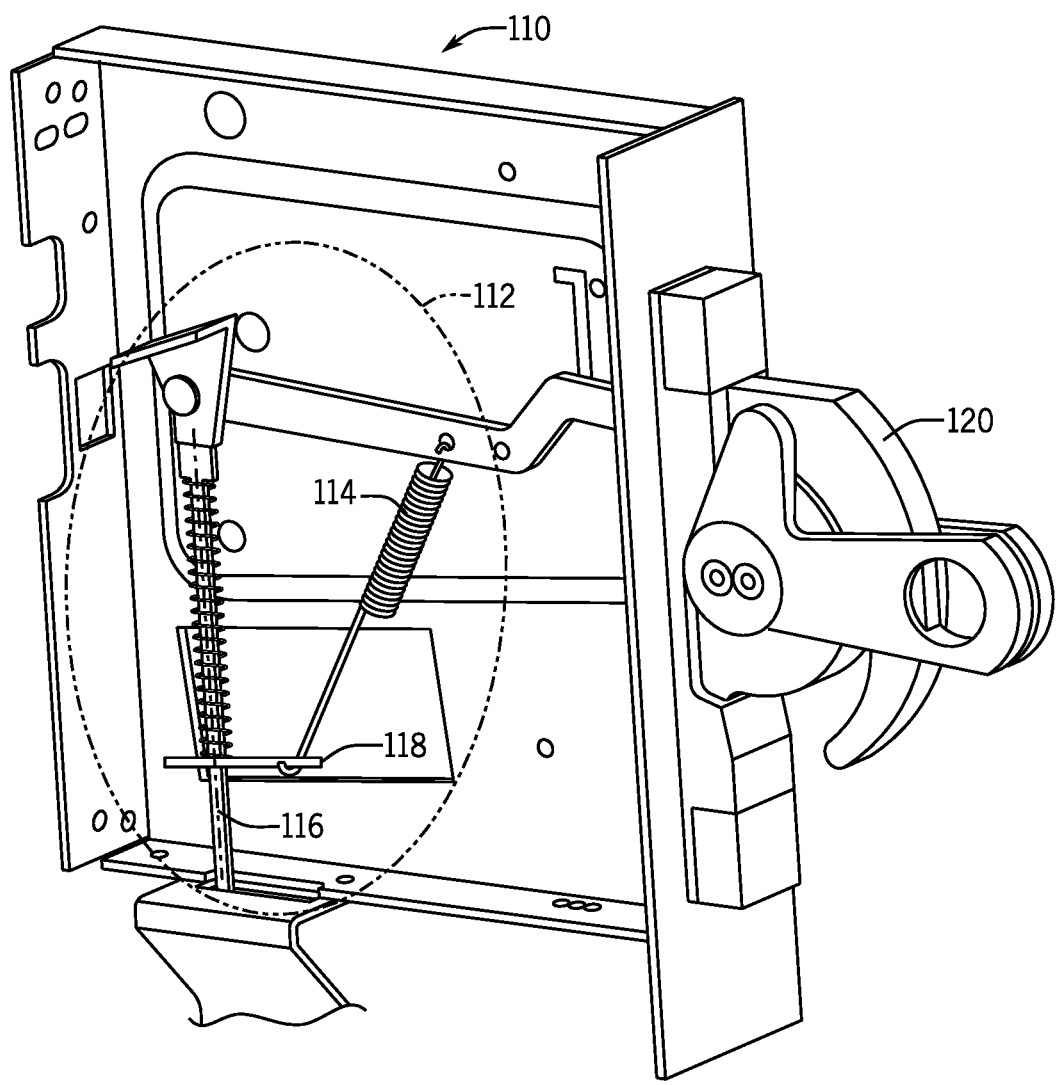
FIG. 4 is an illustration of a housing unit for the solid-state circuit breaker of FIG. 1, in accordance with an embodiment.

To elaborate, FIG. 4 is an illustration of a housing unit 110 for the solid-state circuit breaker 14, where the solid-state circuit breaker 14 may be disposed within the housing unit 110. The housing unit 110 may include a latch mechanism 112 designed to operate a galvanic disconnecting device associated with (e.g., galvanic disconnecting devices 84) and/or disposed within the solid-state circuit breaker 14, providing mechanical galvanic isolation. The latch mechanism 112 may include a latch device 114 (e.g., spring that operates interconnecting devices) to decouple a supply-side (e.g., line-side) from a load-side of the solid-state circuit breaker 14 using the galvanic disconnecting device for maintenance access or withdrawal of the housing unit 110. For example, the latch mechanism 112 may operate to interlock the housing unit 110 and/or door of the housing unit 110 with the latch device 114 and/or a device coupled or operable by the latch device 114.

When interlocked, the solid-state circuit breaker 14 may not be removed from a cabinet space within a motor control center and/or an installation site based at least in part on the latch device 114 locking the solid-state circuit breaker 14 in place. For example, the latch device 114 may control a position on an axis 116 of a metal plate 118. When a handle 120 of the housing unit 110 is operated into an "off" position (e.g., when the solid-state circuit breaker 14 is de-energized), the latch mechanism 112 may pull the latch device 114 taut, causing the metal plate 118 to move upward on the axis 116. This motion may adjust any interlocking circuitry of the solid-state circuit breaker 14 to permit removal of the solid-state circuit breaker 14 from a motor control center cabinet and/or from the housing unit 110. When the handle 120 is operated into an "on" position (e.g., when the solid-state circuit breaker 14 is energized) and/or a "trip" position (e.g., de-energized in response to an undesired operation), the latch mechanism 112 may release the latch device 114, causing the metal plate 118 to move downward on the axis 116. The metal plate 118 moving downward on the axis 116 may adjust at least some interlocking circuitry of the solid-state circuit breaker 14 to block access to the solid-state circuit breaker 14. In this way, the solid-state circuit breaker 14 may be mechanically blocked from being accessed (e.g., being removed from a motor control center cabinet and/or from the housing unit 110, being opened for inspection and/or maintenance) while the solid-state circuit breaker 14 is energized and/or in a trip state (e.g., permitting removal when the handle 120 is in an "off" position as opposed to "on" or "trip").

Additionally or alternatively, the SSCB 14 may be operated electronically based on the position of the handle 120. For example, when in the "open" position, the SSCB 14 may receive a signal to reverse bias the respective semiconductor devices, such that the SSCB 14 may go to the "open" state. The SSCB 14 may also provide an indication of the operative state via an electronic display, a light indicator, or the like. Additionally, a latch device 114 may be electronically controlled by the SSCB 14 based on the operative states. For example, when the SSCB 14 is in the "trip" or "open" state, the SSCB 14 may send a signal to operate the latch device 114 to lock the door of the housing unit 110. When in the lock position, the latch device 114 may restrict and/or prevent access to the SSCB 14. In certain embodiments, the handle 120 may be operated electronically. For example, the housing unit 110 may include an actuator device that may be operated to move the handle 120 between positions, secure the position of the handle 120 in either position, and the like. Additionally or alternatively, the housing unit 110 may include an actuator device that may be operated to move the latch mechanism 112 between positions, secure the position of the latch mechanism 112 in either position, and the like. For example, the actuator device may be operated to pull the latch device 114 taut taught, release the latch device 114, secure the position of the latch device 114 in either position, and so forth.

In this way, when the solid-state circuit breaker 14 is not energized, the latch mechanism 112 may permit removal of the solid-state circuit breaker 14 from the cabinet space and/or the installation site based at least in part on the latch device 114 being operated via the actuator device into an orientation that permits such removal. Interlocking capabilities of the solid-state circuit breaker 14 may be provided additionally or alternatively to interlocking capabilities of the housing unit 110, such that a combination of a position of the handle 120 and an operational state of the solid-state circuit breaker 14 may permit or deny removal of the solid-state circuit breaker 14. For example, one or more sensed values may be used by the control system 18 to unlock or lock interlocking circuitry of the solid-state circuit breaker 14, such as in response to detecting no voltage or no current conditions within or from the solid-state circuit breaker 14. In some embodiments, a defeating mechanism may be included to override any interlocking devices of the solid-state circuit breaker 14, such as a key that a user may use to override an interlocking device.

Additionally or alternatively, an air-gap disconnect device 145 (e.g., integrated air-gap disconnect device) may be used with the solid-state circuit breaker 14, such as alone or in combination with the latch mechanism 112. In some embodiments, the integrated air-gap disconnect device may be associated with a push button 147. When the push button is pressed, interlocking circuitry may disengage and permit retraction springs to pull contacts of the solid-state circuit breaker 14 away from each other to form an air gap between the contacts. For example, the integrated air-gap disconnect device may cause galvanic isolation between a supply-side and a load-side of the solid-state circuit breaker 14 in response to the latch device 114 being extended by movement of the handle 120. Powering-down electronics of the solid-state circuit breaker 14 before operating the integrated air-gap disconnect device 145 may reduce a likelihood of arcing occurring when the air gap is being formed between the contacts.

The control system 18 may use the integrated air-gap disconnect device 145 when performing lockout/tagout control operations and/or when electrically isolating devices coupled downstream of the solid-state circuit breaker 14 from devices coupled upstream of the solid-state circuit breaker 14. Integrated air-gap disconnect devices 145 may be used in combination with air gaps provided internal to the solid-state circuit breaker 14 and/or in combination with interlocking circuitry of the housing unit 110. In some cases, additional external disconnect switches may be used in combination with solid-state circuit breakers 14 to further electrically disconnect a line-side of the solid-state circuit breaker 14 from the solid-state circuit breaker 14.

Figure 5:
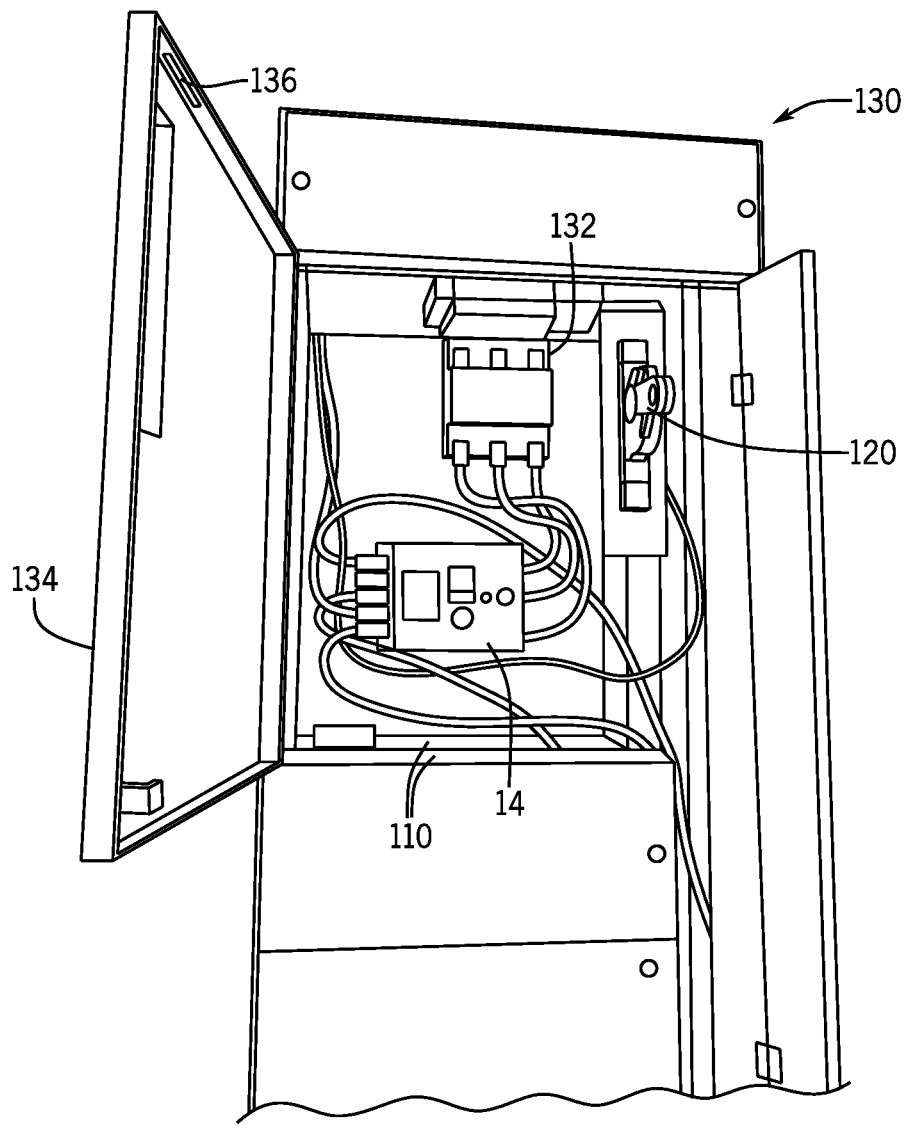
FIG. 5 is an illustration of a cabinet that includes the housing unit of FIG. 4 and the solid-state circuit breaker of FIG. 1, in accordance with an embodiment.

For example, FIG. 5 is an example illustration of a cabinet 130 that includes the housing unit 110 and the solid-state circuit breaker 14. The housing unit 110 may also include one or more upstream switches 132. In this example system, the galvanic disconnecting device 84 may be replaced by the solid-state circuit breaker 14 coupled to additional circuit breakers or fused disconnect switches (e.g., upstream switches 132) upstream from the solid-state circuit breaker 14. The upstream switches 132 may respectfully couple to each line feeding the solid-state circuit breaker 14 (e.g., L1, L2, L3). Each upstream switch of the upstream switches 132 may couple in series with the solid-state circuit breaker 14 to provide disconnecting circuit isolation. The upstream switches 132 may be used in combination with any of the systems and/or methods described herein. The handle 120 may electrically disconnect the solid-state circuit breaker 14 and/or the upstream switches 132. In some cases, the upstream switches 132 may automatically isolate the solid-state circuit breaker 14 from one or more power supplies in response to the upstream switches 132 detecting a change in transmitted current (e.g., $\Delta di/\Delta dt$). The upstream switches 132 may be used to decouple the solid-state circuit breaker 14 from the line-side of the solid-state circuit breaker 14 additional to or alternative of an integrated air-gap disconnect.

The housing unit 110 may include a door 134 (e.g., front panel, hinged door) that may seal the housing unit 110 and may prevent access to the solid-state circuit breaker 14. The door 134 may include an aperture through which the handle 120 may protrude. As such, an operator may be permitted to operate the handle 120 when the door 134 is in a closed and/or sealed position. The housing unit 110 may also include a door sensor 136. The door sensor 136 may determine a status (e.g., open, closed, locked, unlocked) of the door 134 of the housing unit 110. The door sensor 136 may be communicatively coupled to one or more of the SSCBs 14 and may transmit a signal based on the door status to adjust the operation of the SSCBs 14 or prevent operation of the SSCBs 14. For example, if the door status indicates the door 134 is open or unlocked, the door sensor 136 may transmit a signal to the SSCBs 14 to prevent operation of the SSCBs 14, reverse bias the semiconductor devices of the SSCBs 14, or to adjust the operation of the SSCBs 14 to an "off" state. Additionally, if the door status indicates the door 134 is closed and locked, the door sensor 136 may transmit a signal to the SSCBs 14 to allow operation of the SSCBs 14 or to adjust operation of the SSCBs 14 to an "on" state. The door sensor 136 may also communicate with a secondary device to provide an indication of the door status. In some embodiments, the door sensor 136 may be communicatively coupled to the control system 18. As such, the door sensor 136 may transmit a signal indicative of the door status to the control system 18. Accordingly, the control system 18 may receive the signal and may adjust the operation of the SSCBs 14 based on the signal. Additionally or alternatively, the cabinet 130 may include the door 134 and/or the door sensor 136.

Figure 6A:
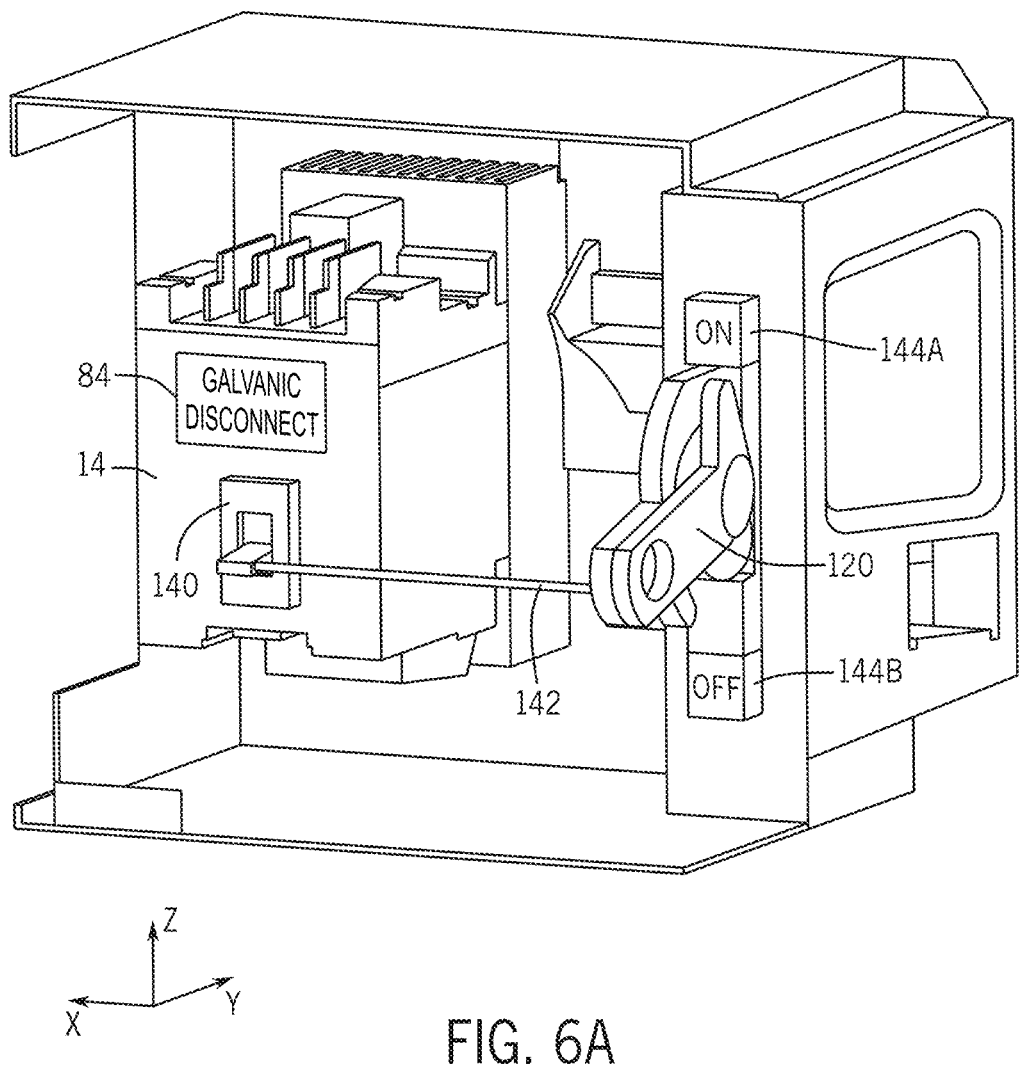
FIG. 6A is an illustration of the housing unit of FIG. 4 and the solid-state circuit breaker of FIG. 1 having a handle in a first position, in accordance with an embodiment.
Figure 6B:
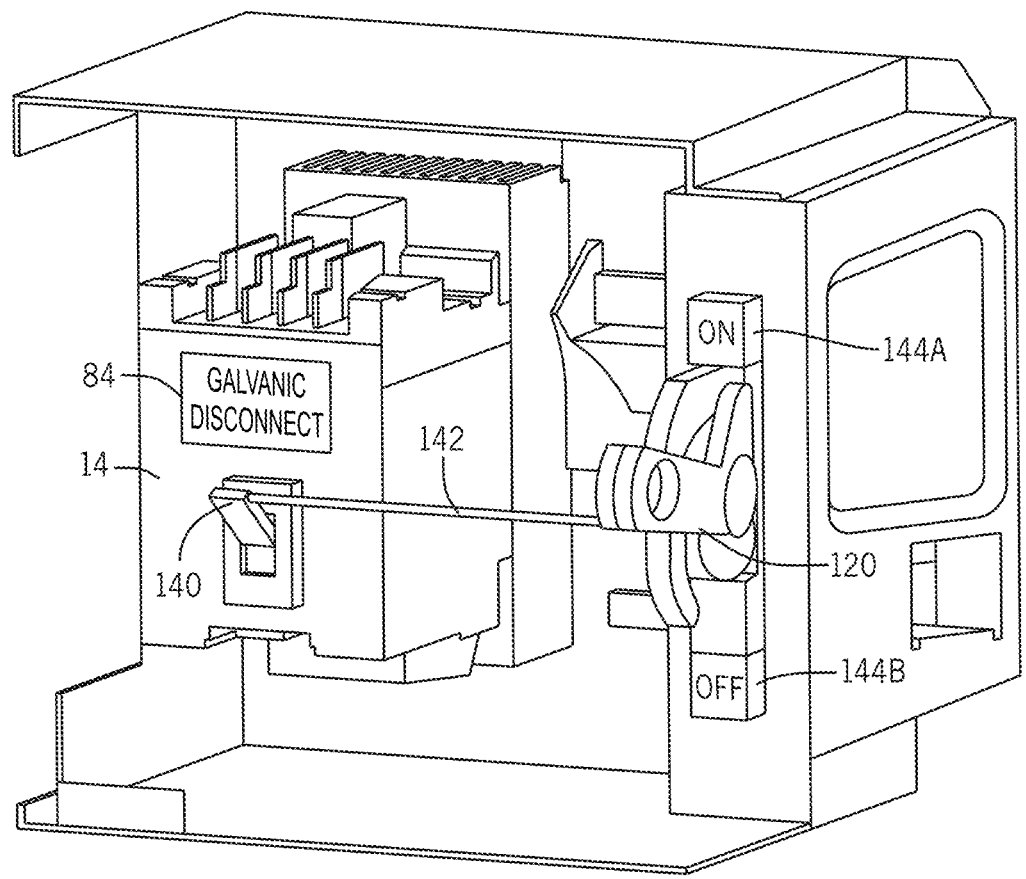
FIG. 6B is an illustration of the housing unit of FIG. 4 and the solid-state circuit breaker of FIG. 1 having a handle in a second position, in accordance with an embodiment.

FIGS. 6A and 6B are illustrations of the housing unit 110 including the solid-state circuit breaker 14 and an example toggle lever 140. The SSCB 14 may include a toggle lever 140 to switch the SSCB 14 between several operative states (e.g., "on", "off", "trip", "reset"). In some embodiments, a mechanical linkage 142 may couple the toggle lever 140 and the handle 120 to tie movement of the handle 120 to the operation of the SSCB 14. For example, a bail mechanism may be coupled between the toggle lever 140 and the handle 120. The bail mechanism may contact the toggle lever 140 to move the toggle lever 140 between several positions corresponding to the operative states of the SSCB 14.

In this way, the handle 120 may move between various positions (e.g., a first position illustrated in FIG. 6A, a second position illustrated in FIG. 6B) that may allow the toggle lever 140 to be moved while keeping the SSCB 14 secure inside the housing unit 110. Further, the handle 120 may include an additional position that may operate the galvanic disconnecting device mentioned above to provide mechanical galvanic isolation to remove the SSCB from the housing unit 110. Additionally or alternatively, the SSCB 14 may include separate handles to operate the toggle lever 140 and to interlock the SSCB 14. For example, the handle 120 may prevent access to the SSCB 14 when in a locked position. In certain embodiments, a second handle (e.g., placed adjacent the handle 120) may operate the toggle lever 140 between operative states. As such, an operator may move the second handle to adjust the operation of the SSCB 14 while restricting access to the SSCB 14 in the enclosure with the handle 120 in the locked position. Additionally, a mechanical linkage may connect the handle 120 and the second handle to tie movement of the handle 120 to movement of the second handle. For example, movement of the handle 120 from the locked position (e.g., in FIG. 6B) to an unlocked position (e.g., in FIG. 6A) may cause movement of the second handle to adjust the operation of the SSCB 14 (e.g., move to an "off" state). Accordingly, the handle 120 and the second handle may be linked to shut off the SSCB 14 with the second handle before accessing the SSCB 14.

The air-gap disconnect device 145 may be used with the SSCB 14 to disengage and permit retraction springs to pull contacts of the SSCB 14 away from each other to form an air gap between the contacts. The air-gap disconnect device 145 may include an actuator (e.g., push button 147) that connects to the handle 120 and operates the air-gap disconnect device 145 in response to movement of the handle 120.

With this in mind, the handle 120 may include yet another position (e.g., in directions 151 or 153 from the first position of FIG. 6A) to provide an input to the SSCB 14 to engage the air-gap disconnect device within the SSCB 14. In some embodiments, movement of the handle 120 to the position to operate the air-gap disconnect device 145 may first cause the control system 18 to power-down electronics of the SSCB 14 before operating the air-gap disconnect device 145, thereby reducing the likelihood of arcing occurring when the air gap is formed between the contacts.

The housing unit 110 may also include one or more indicators 144A, 144B (collectively referred to herein as "indicators 144"). The indicators 144 may provide a visual indication of the operative state of the SSCB 14. In certain embodiments, the indicators 144 may include pilot lights and/or sensors that turn on or off based on the operative state of the SSCB 14. The indicators 144 may be collocated with sensors or other suitable circuitry that may be communicatively coupled to the SSCB 14. That is, the sensors may detect the position of the handle 120 and may send a signal indicative of the expected operative state of the SSCB 14 that corresponds to the position of the handle 120. In certain embodiments, each indicator 144 may correspond to a particular operative state of the SSCB 14. As such, the corresponding indicator may provide a visual indication (e.g., turn on) when the SSCB is in the particular operative state. As shown in FIG. 6, the indicators 144 may provide the visual indication based on a position of the handle 120. By way of operation, movement of the handle 120 between different positions may trigger a change (e.g., turn on, turn off) in the operative state of the SSCB 14 in accordance with the position of the handle 120 relative to the respective indicator 144. In certain embodiments, the sensors or circuitry that corresponds to the indicators 144 may be communicatively coupled to a secondary device, such as the control system 18, the door sensor 136, an operator device, and the like, and may receive signals indicative of the operative state of the SSCB 14 from the secondary device, such that the secondary device may perform operations based on the operative state of the SSCB 14.

Figure 7:
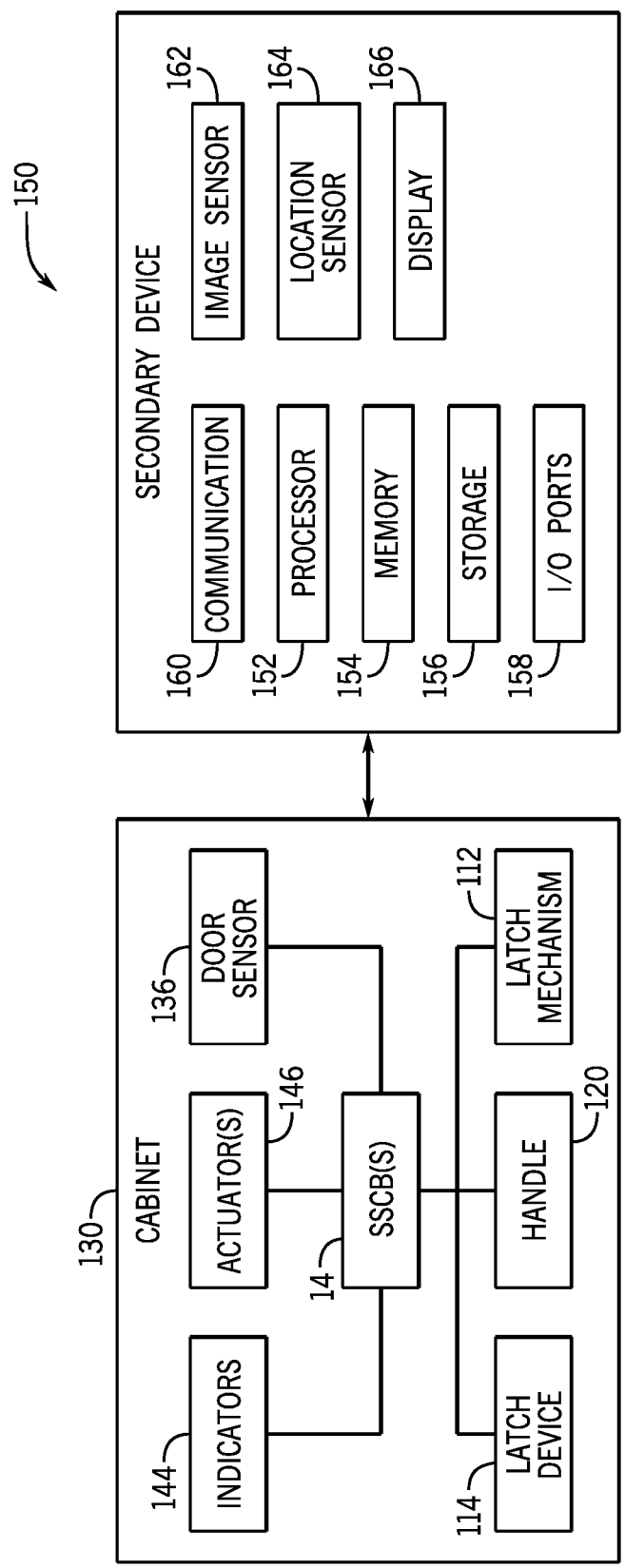
FIG. 7 is a block diagram of the cabinet of FIG. 5 and a secondary device, in accordance with an embodiment.

FIG. 7 is a block diagram of components of the cabinet 130 that may communicate with a secondary device 150, such as an operator device, in accordance with an embodiment of the disclosure. The cabinet 130 may include any number of actuators 146, such as pneumatic or hydraulic cylinders, solenoids, and the like. Each actuator 146 may be movably coupled to at least one of the handle 120, the latch mechanism 112, or the latch device 114. The actuators 146 may be communicatively coupled to the SSCBs 14, the control system 18, or the like and may receive signals from the SSCBs 14 or the control system 18 to adjust a position of the handle 120, a position of the latch mechanism 112, and/or a position of the latch device 114. For example, the actuator 146 may receive a signal from the control system 18 based on states of one or more of the SSCBs 14 prior to energizing to ensure the handle 120 is in and/or moved to the corresponding on or energized position. The actuator 146 may adjust and move the handle to the corresponding position based on the signal representative of the states of the SSCBs 14. Additionally or alternatively, the actuators 146 may be directly communicatively coupled to the SSCBs 14 and perform certain actions based on properties (e.g., voltage, current, resistance) measured within the SSCBs 14. For example, the actuators 146 may receive a signal indicative of one or more of the SSCBS being in an energized state and may move the handle 120, the latch mechanism 112, and/or the latch device 114 to corresponding states (e.g., locked, closed). In addition, the actuator 146 may also receive signals from a secondary device 150 (e.g., mobile computing device, smart phone, smart tablet) to adjust the position of the handle 120. For example, secondary device 150 may transmit a first signal to the actuator 146 to adjust the position of the handle 120 before the SSCBs 14 are closed to ensure that the circuitry within the cabinet 130 are secured and blocked from user access prior to the circuitry being energized via the SSCBs 14. The secondary device 150 may then transmit a second signal indicative of a command to close one or more SSCBs 14 within the cabinet 130 to the SSCBs 14 after receiving a confirmation that the handle 120 is moved to a locked position in which the door 134 is secured in a closed position. The secondary device 150 may transmit the signal to the SSCBs 14 and the second signal according to any order (e.g., concurrently, consecutively, simultaneously, within a specified time frame, and so forth). The actuator 146 may receive the signal and/or the second signal and may adjust the position of the handle 120 based on the signal and/or the second signal. Additionally or alternatively, the secondary device 150 may receive a signal indicative of one or more operating states of one or more SSCBs 14. The secondary device 150 may transmit a signal to adjust the position of the handle 120, the latch mechanism 112, and/or the latch device 114 based on the operating states. For example, the secondary device 150 may determine one or more of the SSCBs 14 are in an energized state. The secondary device 150 may also receive a signal indicative of the position of the handle 120, the position of the latch mechanism 112 (e.g., locked, unlocked), and/or the latch device 114 (e.g., locked, unlocked), such as, from the indicators 144. As such, the secondary device 150 may determine the housing unit 110 is not in a secure state (e.g., unlocked, handle 120, latch mechanism 112, and/or latch device 114 in incorrect position, and so forth) and may instruct the actuators 146 to adjust the handle 120, the latch mechanism 112, and/or the latch device 114 to corresponding positions. Accordingly, the actuators 146 may be utilized to ensure correct operation of the housing unit 110 and protection of the operators.

The secondary device 150 may include a communication component 160, a processor 152, memory 154, storage 156, I/O ports 158, and a display 166, which may be similar to the components described above with respect to the control system 18. In some embodiments, the communication component 160 may communicatively couple the secondary device 150 to the SSCBs 14, the door sensor 136, the indicators 144, or the like via a wired and/or wireless communication network, such as EtherNet/IP, ControlNet, DeviceNet, or any other industrial communication network protocol.

The display 166 of the secondary device 150 may display a user interface that includes indications of the operative states of one or more SSCBs, the indicators 144, and/or the door sensor 136. In certain embodiments, the display 166 may display a signal indicative of an event (e.g., adjust operating state, door event, trip event, reset event, turn on SSCB 14, and so forth) at the cabinet 130. As such, the secondary device 150 may provide real-time indications of operating states of the SSCBs 14, a position of the handle 120, a position of the door 134, operating states of the indicators 144, and the like.

The secondary device 150 may also include an image sensor 162, which may include any image acquisition circuitry such as a digital camera capable of acquiring digital images, digital videos, or the like. For example, the image sensor 162 may capture image data associated with the cabinet 130, the SSCBs 14, the door sensor 136, the indicators 144, and the like. In certain embodiments, the image sensor 162 may transmit the image data to the processor 152 and the processor 152 may analyze and/or process the image data to facilitate diagnosis of the SSCBs 14. For example, the processor 152 may determine operative states of the SSCBs 14 based on the image data. For example, the processor 152 may determine a position of the handle 120 based on the image data. As such, the processor 152 may determine the handle 120 is in an "off" position and may determine and present information indicative of the position of the handle 120 via the display 166. Additionally or alternatively, the processor 152 may determine one or more of the SSCBs is in an energized or on state based on image data including an image of the indicators 144. Accordingly, the processor 152 may present a warning or alert indicative of the state of the SSCBs 14 via the display 166.

The secondary device 150 may also include a location sensor 164, which may include circuitry designed to determine a physical location of the secondary device 150. In one embodiment, the location sensor 164 may include a global positioning system (GPS) sensor that acquires GPS coordinates for the secondary device 150. The processor 152 may utilize the location sensor 164 to determine a proximity to one or more SSCBs 14. The location sensor 164 may generate location data and may transmit the location data to the processor 152. In certain embodiments, the processor 152 may utilize the location data to present information associated with one or more SSCBs 14 within a threshold distance of the secondary device 150. For example, the processor 152 may determine one or more SSCBs 14 and/or the cabinet 130 is within a threshold distance. In some embodiments, the processor 152 may transmit a request to the one or more SSCBs 14 to provide the respective operating states of the one or more SSCBs 14. For example, the processor 152 may receive signals indicative of the respective operating states of the one or more SSCBs 14 and may present a graphical user interface that includes icons representative of the one or more SSCBs 14 and/or the cabinet 130. Additionally or alternatively, the visual representation may provide a layout of the SSCBs 14 within the cabinet 130. For example, the processor 152 may receive and/or retrieve the layout of the cabinet 130 from the memory 154 and/or the storage 156. Additionally or alternatively, the processor 152 may receive signals from the SSCBs 14 that provide a corresponding position of the SSCBs 14 within the cabinet 130. The icons may include indications of the operating states based on the signals. Additionally or alternatively, the secondary device 150 may receive and/or retrieve data indicative of operating states from the memory 154 and/or the storage 156. As such, as the secondary device 150 approaches the cabinet 130, the secondary device 150 may present information associated with the SSCBs 14 of the cabinet 130 via the display 166 to assist in monitoring and/or troubleshooting the SSCBs 14.

An operator may select any of the icons representative of the SSCBs 14 to view information about the SSCBs 14, including an operative state, a model number, a vendor, a serial number, and the like. Additionally, the icons may include a heat map based on the status of the SSCBs 14. For instance, the heat map may correspond to a color-coding of the graphical representations based on the operative state. Each operative state may correspond to a separate color. In some instances, the operator may adjust an operative state of the SSCBs 14 via the visualization. For example, the operator may select any of the representations and the secondary device 150 may receive an input to adjust the operation of the selected SSCB 14. The secondary device 150 may transmit a signal to the SSCB 14 to adjust the operation based on the input. Additionally, the secondary device 150 may display the status of the door sensor 136 and may transmit signals to adjust operation of the SSCB 14 based on the status. For example, the cabinet 130 may include an electronic lock that receives the signal from the secondary device 150 and unlocks the door 134 to provide access to the SSCBs 14 after determining that the SSCBs 14 are in an open state. The latch device 114 may be communicatively coupled to the secondary device 150 and/or the SSCBs 14 and may lock or unlock based on signals from the secondary device 150 and/or the SSCBs 14. In certain embodiments, the latch device 114 may be movably operated by a second actuator of the cabinet 130. The second actuator may be communicatively coupled to the secondary device 150 and/or the SSCBs 14 and may receive signals to adjust the position of the latch device 114

In certain embodiments, the secondary device 150 or the communication component 160 of the secondary device 150 may include an antenna to receive and/or transmit signals from and/or to other electronic devices (e.g., computing devices, industrial automation devices, control systems, and the like). For example, the antenna may receive the signal and may transmit the signal to the processor 152. The processor 152 may determine a command associated with the received signal. The processor 152 may receive the signal and may perform an action (e.g., receive operating states, display user interface, update operating states, and the like) based on the received signal.

In some embodiments, the secondary device 150 may transmit signals (e.g., data) to the SSCBs 14, the door sensor 136, and/or the indicators 144. The processor 152 may receive an operational status corresponding to the solid-state circuit breaker 14, a position of the handle 120, the door 134, and/or the door sensor 136. In this way, the processor 152 may control operation of the solid-state circuit breakers, such that access to and/or removal of the solid-state circuit breaker 14 may be permitted based on the one or more operational statuses. For example, prior to energizing the solid-state circuit breaker 14, the processor 152 may ensure that access to the solid-state circuit breakers 14 is prevented by closing and/or locking a door of the enclosure. As such, the coordinated communications to various devices via the communication component 160 may ensure that certain components are de-energized using the solid-state circuit breaker 14 before providing access to the components. For example, the secondary device 150 may transmit one or more signals to adjust operating states of the SSCBs 14. Additionally or alternatively, the secondary device 150 may receive and/or store data or signals from the SSCBs 14, the door sensor 136, and/or the indicators 144.

Furthermore, different operators may have different levels of authentication that permit the different operators varying control and/or access levels to the operation of the solid-state circuit breakers 14. For example, some operators may have higher or lower permission profiles than other operators. Different permission profiles may permit some operators to operate the solid-state circuit breaker 14 (e.g., using the control system 18) to open or close and/or check a status of the solid-state circuit breaker 14, while some operators are permitted to check the status of the solid-state circuit breaker 14 without having permission to operate the solid-state circuit breaker 14 to open or close. The permission profiles may also be used in combination with the latch mechanism 112 and/or interlocking circuitry of the solid-state circuit breaker 14 to selectively permit or deny access to the solid-state circuit breaker 14.

Technical effects of the present disclosure include techniques for protecting an electrical load from abnormal operation, transients, overvoltage, or the like, that may affect power supplied to the electrical load. A solid-state circuit breaker may be included upstream from an electrical load. The solid-state circuit breaker may be manufactured to not use mechanical switching to electrically isolate its output from its input. Reducing or eliminating use of mechanical switching may reduce a likelihood of arc flash and/or reduce a severity of exposed incident energy if an arc flash were to occur. Furthermore, a control system may communicatively couple to the solid-state circuit breaker and may receive operational indications and/or statuses from the solid-state circuit breaker. A cabinet or enclosure may house one or more solid-state circuit breakers and may include mechanical and/or electrical features for communication with and/or operation of the solid-state circuit breakers.

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system comprising:
a plurality of solid-state circuit breakers configured to couple between a power supply and an electrical load, wherein one or more solid-state circuit breakers of the plurality of solid-state circuit breakers comprise:
a toggle lever configured to adjust an operating state of a respective solid-state circuit breaker based on a position of the toggle lever;
a mechanical linkage configured to couple to the toggle lever; and
at least two contacts configured to form an air gap between the power supply and the electrical load to provide galvanic isolation between the power supply and the electrical load; and
a housing, wherein the plurality of solid-state circuit breakers is disposed within the housing, the housing comprising:
a door sensor configured to generate a first signal indicative of a position of a door of the housing;
a circuit configured to generate a second signal indicative of an additional position of a handle of the housing, wherein the mechanical linkage is configured to couple to the handle of the housing and cause the toggle lever to move in accordance with the additional position of the handle; and
an actuator configured to move the toggle lever, the mechanical linkage, the handle of the housing, or any combination thereof; and
a secondary device communicatively coupled to the plurality of solid-state circuit breakers, the door sensor, and the circuit, the secondary device configured to:
receive the first signal and the second signal; and
receive one or more operating states of the one or more solid-state circuit breakers of the plurality of solid-state circuit breakers; and
send an instruction to the actuator to cause the toggle lever, the mechanical linkage, the handle, or any combination thereof to move based on the first signal, the second signal, and the one or more operating states, wherein the actuator is configured to adjust positions of the at least two contacts to form the air gap or remove the air gap.

2. The system of claim 1, wherein the secondary device is configured to send a second instruction to the actuator to adjust the additional position of the handle based on the first signal and the second signal.

3. The system of claim 1, wherein the housing comprises a latch mechanism configured to lock the door to the housing.

4. The system of claim 3, wherein the secondary device is configured to send a second instruction to a second actuator to adjust the latch mechanism.

5. The system of claim 1, wherein the secondary device is configured to receive a plurality of signals, each signal of the plurality of signals indicative of a corresponding operating state of a respective solid-state circuit breaker of the plurality of solid-state circuit breakers.

6. The system of claim 5, wherein the secondary device is configured to generate a visual representation of the plurality of solid-state circuit breakers based on the plurality of signals.

7. The system of claim 6, wherein the visual representation comprises an operating state of each solid-state circuit breaker of the plurality of solid-state circuit breakers.

8. The system of claim 1, wherein the secondary device is configured to generate the instruction to close the one or more solid-state circuit breakers based on the first signal and the second signal.

9. A method comprising:
receiving, at a processor, a plurality of signals from a plurality of solid-state circuit breakers disposed within a housing with a handle, each signal of the plurality of signals indicative of a corresponding operating state associated with a respective solid-state circuit breaker of the plurality of solid-state circuit breakers, wherein one or more solid-state circuit breakers of the plurality of solid-state circuit breakers comprises:
a toggle lever configured to adjust the corresponding operating state of a respective solid-state circuit breaker based on a position of the toggle lever;
a mechanical linkage configured to couple to the toggle lever;
at least two contacts configured to form an air gap between a power supply and an electrical load to provide galvanic isolation between the power supply and the electrical load;
in response to determining at least one signal of the plurality of signals is indicative of an energized state of at least one solid-state circuit breaker of the plurality of solid-state circuit breakers:
receiving, at the processor, a second signal indicative of a position of a door of the housing, wherein the mechanical linkage is configured to couple to the handle of the housing and cause the toggle lever to move in accordance with a position of the handle; and
in response to determining the second signal is indicative of the door being in an open position, sending, to the at least one solid-state circuit breaker of the plurality of solid-state circuit breakers, an instruction to adjust the corresponding operating state of the at least one solid-state circuit breaker of the plurality of solid-state circuit breakers; and
sending a command to an actuator configured to move the toggle lever, the mechanical linkage, the handle of the housing, or any combination thereof to cause the toggle lever, the mechanical linkage, the handle of the housing, or any combination thereof to move based on the operating state of the at least one solid-state circuit breaker, wherein the actuator is configured to adjust positions of the at least two contacts to form the air gap or remove the air gap.

10. The method of claim 9, comprising:
in response to determining the at least one signal of the plurality of signals is indicative of an energized state of at least one solid-state circuit breaker of the plurality of solid-state circuit breakers:
receiving, at the processor, a third signal indicative of a position of the handle of the housing; and
in response to determining the third signal is indicative of the handle being in an open position, sending a second instruction to the actuator to adjust the position of the handle.

11. The method of claim 10, comprising:
in response to determining the at least one signal of the plurality of signals is indicative of an energized state of at least one solid-state circuit breaker of the plurality of solid-state circuit breakers:
receiving, at the processor, a fourth signal indicative of a position of a latch mechanism of the housing; and
in response to determining the fourth signal is indicative of the latch mechanism being in an unlocked position, sending a third instruction to a second actuator to adjust the position of the latch mechanism.

12. The method of claim 11, comprising:
receiving, at the processor, a layout of the housing;
generating, at the processor, a visual representation of the layout of the housing, wherein the visual representation comprises a plurality of icons, each icon of the plurality of icons representative of a respective solid-state circuit breaker of the plurality of solid-state circuit breakers; and
displaying the visual representation.

13. The method of claim 12, wherein each icon of the plurality of icons comprises an indication of the corresponding operating state associated with the respective solid-state circuit breaker.

14. The method of claim 12, comprising:
receiving an input indicative of a selection of a set of icons of the plurality of icons, the set of icons representative of a set of solid-state circuit breakers of the plurality of solid-state circuit breakers;
receiving a second input indicative of a fourth instruction to adjust operating states associated with the set of solid-state circuit breakers; and
sending the fourth instruction to the set of solid-state circuit breakers to cause the set of solid-state circuit breakers to adjust operating states.

15. The method of claim 12, comprising updating the visual representation based on the second signal, wherein the visual representation comprises an indication of the position of the door.

16. The method of claim 12, comprising updating the visual representation based on the third signal, wherein the visual representation comprises an indication of the position of the handle.

17. A non-transitory computer-readable medium comprising computer-executable instructions that, when executed, are configured to cause at least one processor to perform operations comprising:
receiving a request to adjust a plurality of operational states of a plurality of solid-state circuit breakers disposed within a housing and configured to couple between a power supply and an electrical load, wherein one or more solid-state circuit breakers of the plurality of solid-state circuit breakers comprise:
a toggle lever configured to adjust an operating state of a respective solid-state circuit breaker based on a position of the toggle lever;
a mechanical linkage configured to couple to the toggle lever; and
at least two contacts configured to form an air gap between the power supply and the electrical load to provide galvanic isolation between the power supply and the electrical load;
receiving a first signal indicative of a position of a handle of the housing, wherein the mechanical linkage is configured to couple to the handle of the housing and cause the toggle lever to move in accordance with the position of the handle;
receiving a second signal indicative of a position of a door of the housing;
in response to the first signal being indicative of the handle being in an on position and the second signal being indicative of the door being in a closed position, transmitting one or more instructions to the plurality of solid-state circuit breakers, wherein the one or more instructions are configured to cause the plurality of solid-state circuit breakers to adjust the plurality of operational states; and
in response to the second signal being indicative of the door being in an open position, transmitting one or more additional instructions to an actuator to cause the toggle lever, the mechanical linkage, the handle, or any combination thereof to move.

18. The non-transitory computer-readable medium of claim 17, wherein the computer-executable instructions are configured to cause the at least one processor to perform the operations comprising:
receiving a third signal indicative of a second position of the handle of the housing, wherein the third signal is indicative of the handle being in an off position;
generating a second instruction to adjust the operational state of the plurality of solid-state circuit breakers; and
transmitting the second instruction to the plurality of solid-state circuit breakers.

19. The non-transitory computer-readable medium of claim 18, wherein the second instruction causes the plurality of solid-state circuit breakers to adjust to an open state.

20. The non-transitory computer-readable medium of claim 17, wherein the computer-executable instructions are configured to cause the at least one processor to perform the operations comprising transmitting a second instruction to the plurality of solid-state circuit breakers to cause the plurality of solid-state circuit breakers to open in response to the first signal being indicative of the handle being in an off position.

* * * * *